United States Patent
McCarthy

(10) Patent No.: US 7,587,530 B2
(45) Date of Patent: Sep. 8, 2009

(54) METHOD AND APPARATUS FOR MANAGING DEVICE RESERVATION

(75) Inventor: John G. McCarthy, Ft. Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1109 days.

(21) Appl. No.: 10/645,721

(22) Filed: Aug. 20, 2003

(65) Prior Publication Data

US 2005/0044281 A1    Feb. 24, 2005

(51) Int. Cl.
*G06F 3/00* (2006.01)
*G06F 12/00* (2006.01)
*G06F 15/16* (2006.01)

(52) U.S. Cl. .............. 710/36; 710/38; 710/40; 710/45; 710/200; 710/244; 709/228

(58) Field of Classification Search ............. 710/6, 710/36, 45, 38, 46, 40, 200, 244; 709/228
See application file for complete search history.

(56) References Cited

U.S. PATENT DOCUMENTS

| | | | | |
|---|---|---|---|---|
| 5,623,672 A | * | 4/1997 | Popat | .......... 710/240 |
| 5,892,955 A | | 4/1999 | Ofer | |
| 6,182,167 B1 | | 1/2001 | Beverley et al. | |
| 6,327,613 B1 | | 12/2001 | Goshey et al. | |
| 6,587,932 B2 | * | 7/2003 | Tournier | .......... 711/151 |
| 7,158,938 B2 | * | 1/2007 | Labbe et al. | .......... 705/5 |
| 2003/0005130 A1 | * | 1/2003 | Cheng | .......... 709/228 |
| 2003/0187908 A1 | * | 10/2003 | Boucher | .......... 709/103 |
| 2004/0236615 A1 | * | 11/2004 | Msndy | .......... 705/5 |

FOREIGN PATENT DOCUMENTS

GB    2379769    3/2003

OTHER PUBLICATIONS

L. Sentier, European Search Report, Application No. EP04004995, Oct. 22, 2004, 2 pages.
Ralph O. Weber, "Working Draft", Project T10/1416-D, Revision 10, Information technology-SCSI Primary Commands-3 (SPC-3), Nov. 10, 2002, 19 pages.
Ralph O. Weber, "dpANS", Project T10/1416-D, Revision 10, Information technology-SCSI Primary Commands- 2(SPC-2), Jul. 18, 2001, 19 pages.

* cited by examiner

*Primary Examiner*—Niketa I Patel

(57) ABSTRACT

Methods and apparatus are disclosed for managing device reservation. In one embodiment, upon receiving a device command from a first host, a device targeted by the device command is reserved for the first host and a reservation time period for expiration of the reservation status is set.

9 Claims, 4 Drawing Sheets

METHOD AND APPARATUS FOR MANAGING DEVICE RESERVATION

BACKGROUND OF THE INVENTION

Storage devices, such as tape devices, may be configured to allow multiple hosts to access the device. In such configurations, it is important to ensure that hosts are prevented from interfering with the data transfer operations of the other hosts. Data integrity can be compromised if one host accesses the device while another host is performing a data transfer.

One method used in the past to protect data transfers is the Reserve & Release method implemented in Small Computer System Interface (SCSI) devices. This methodology requires that the application or driver on the host implement reserve and release commands. A host can be given exclusive access to a device by issuing a reserve command. When the host is finished with the device, it must then issue a release command to relinquish its reservation of the device. However, if the host holding the reservation on the device experiences a failure, it cannot issue the release. Thus, the device remains unnecessarily reserved for that host. The device may need to be reset manually to recover from this state.

The SCSI Persistent ReserveIn and Persistent ReserveOut commands function similarly to the reserve and release commands. However, these commands also allow any host to issue a Persistent Reserve Out command with the Clear service action to remove any reservations. A second host trying to access a device reserved with the Persistent Reserve In command cannot tell if a reserved device is truly being used or if the device is in a bad state because the host holding the reservation on the device has failed. If a data transfer is particularly lengthy, the second host may decide the host holding the reservation has failed and clear the reservation. This would disrupt any data transfers that may be taking place. If the device is a tape drive, the clear could effectively terminate the entire backup process.

SUMMARY OF THE INVENTION

Methods and Apparatus are disclosed for managing device reservation. In one embodiment, a device command is received from a first host. Upon receiving the command, a device associated with the device command is reserved for the first host. A reservation time period for expiration of the reservation status is also set.

BRIEF DESCRIPTION OF THE DRAWINGS

Illustrative embodiments of the invention are illustrated in the drawings in which.

DETAILED DESCRIPTION

Figure 1:
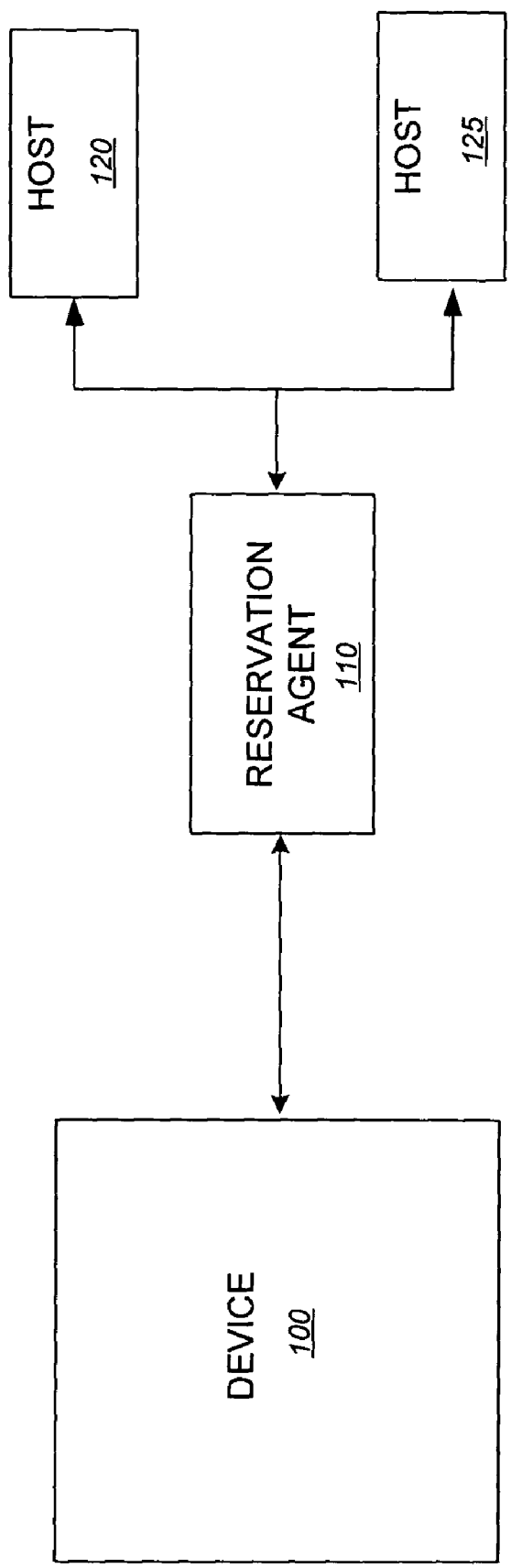
FIG. 1 illustrates an exemplary configuration of a reservation agent.

An exemplary configuration containing a reservation agent 110 for managing device reservation is shown in FIG. 1. Reservation agent 110 is communicatively coupled between hosts 120, 125 and device 100. Hosts 120, 125 may be servers, personal computers, or any other type of machine that provides commands to device 100. Device 100 may be any type of device that accepts commands from multiple sources. In one embodiment, device 100 is a storage device, such as a tape device (e.g., a tape drive or robotic tape library), or disk device (e.g., a hard drive, a RAID device, or optical tape library).

It should be appreciated that configurations different than the one shown in FIG. 1 may be used in alternate embodiments. For example, reservation agent 110 may be part of the firmware of device 100, may be software residing on host 120, 125, or other host, or may be another type of appliance that is communicatively coupled to hosts 120, 125 and device 100. In some embodiments, a control host may be communicatively coupled to reservation agent to configure the reservation agent. Reservation agent 110 may also manage reservations for multiple devices. Additionally, some commands from hosts 120, 125 may be routed directly to the device without going through reservation agent 110 and some or all of the output from device 100 may be routed directly to hosts 120, 125.

Figure 2:
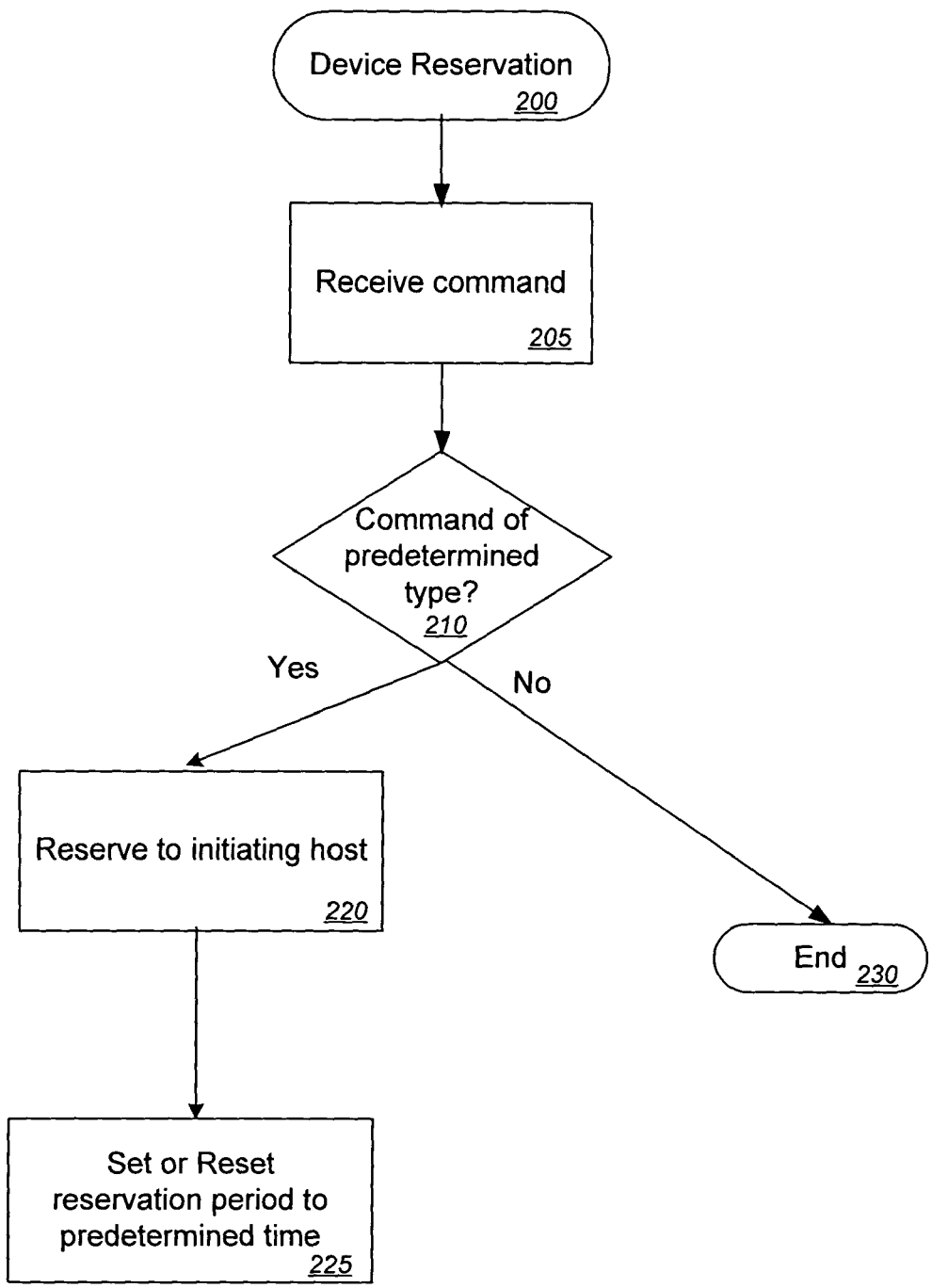
FIG. 2 is a flow diagram illustrating an exemplary method for reserving a device.

FIG. 2 illustrates an exemplary device reservation method 200 that may be performed by reservation agent 110. The method begins when a command is received 205. By way of example, the command may be a Small Computer System Interface (SCSI) command received from host 120 to be performed by device 100. It is contemplated that other communication protocols, such as Internet SCSI (iSCSI) and Fibre Channel, may also be used.

After the command is received, a determination is made as to whether the command is of a predetermined type that requires device reservation 210. Not all commands will require device reservation. The type of commands that require reservation may vary depending upon the type of device 100 and the type of application issuing the command.

By way of example, if the device 100 is a tape device, commands that result in motion of the tape may require device reservation, while commands that do not affect the tape media may not require device reservation. For example, write, read, seek, rewind, load, and unload commands may be commands that require reservation. Providing a reservation method for these types of commands can prevent other hosts from interfering with a data transfer operation of the requesting host. Commands such as the SCSI "inquiry" command which requests the configuration of the device or the SCSI "log_sense" command which retrieves statistical information maintained by the device probably will not require device reservation.

If the command does not require a reservation, the process ends 230. If the command does require device reservation, the device targeted by the device command is reserved for the host initiating the command 220. In one embodiment, this may be accomplished by setting a reservation status by assigning a value to an active host field, implicitly signifying the device is reserved. A reservation time period for expiration of the reservation is also set 225.

The reservation time period may be set before, after, or in conjunction with the setting of the reservation status 220. In one embodiment, the reservation time period may not begin to run until after the command has executed. Thus, the reservation time period will expire if the active host does not have an outstanding command to the device and the timer has expired. In other embodiments, the reservation time period may vary depending upon the type of command and may start as soon as the command executes. For example, a rewind command may be given a reservation time period longer than a write command. This may allow the reservation to be released if a command at the device hangs up. It is contemplated that some embodiments may include both types of reservation time periods: a reservation time period that begins to run after the command has executed and a reservation time period for the execution of the command.

In one embodiment, a host already holding a reservation may be renewing the reservation by issuing a command that requires reservation before the time period of the existing reservation has expired. After a determination is made that the command requires reservation 210, the device may not be reserved for the initiating host since this has already been performed in a previous reservation process. In this embodiment, all that may be required is a reset of the reservation time period 225 to the predetermined time period.

Although the above method describes a process wherein the reservation is set based on the command type, alternate methods may be used in other embodiments. In one embodiment, the command type may not be determined because all commands may reserve the device. Alternately, the host may flag a command as requiring device reservation. The reservation time period may then be set as described above or the host may request or specify a time period needed for the reservation.

Figure 3:
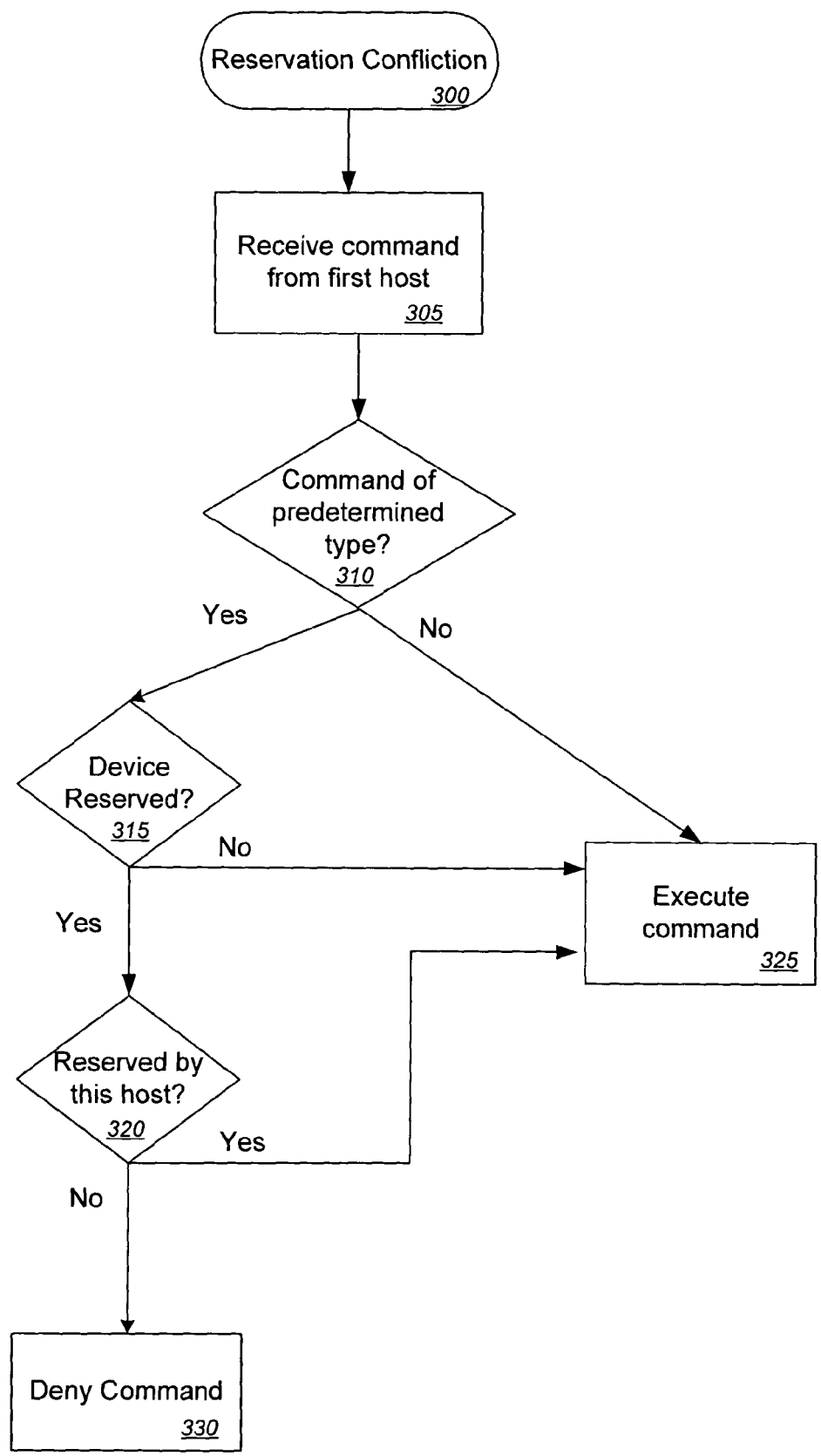
FIG. 3 is a flow diagram illustrating an exemplary method for checking reservation confliction.

Before a command can be executed by the device 100, a determination must be made as to whether the command conflicts with a device reservation. A exemplary method for checking reservation confliction 300 is illustrated in FIG. 3.

Figure 4:
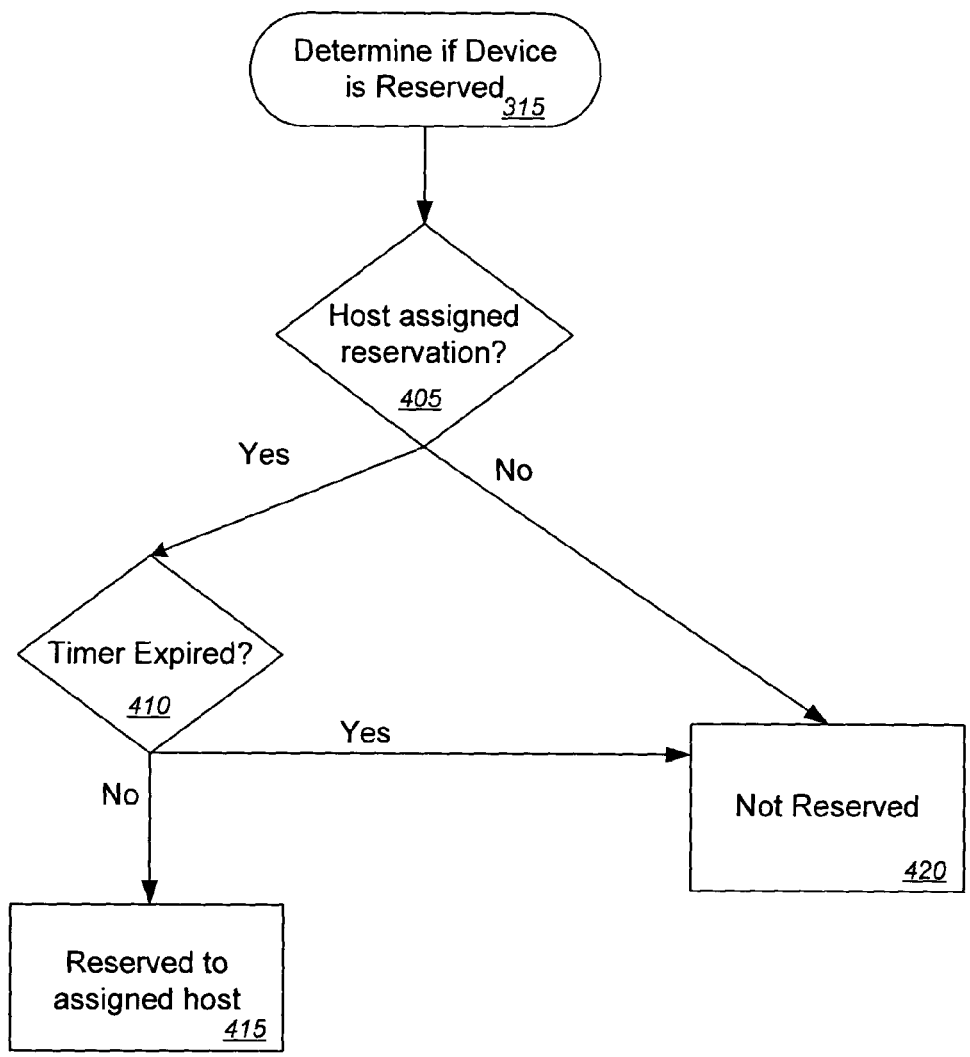
FIG. 4 illustrates an exemplary method for determining if a device is reserved.

After a command is received from a first host 305, a determination is made as to whether the command is of a predetermined type that would conflict with device reservation 310. These commands may be similar to the commands described above in the device reservation process 200. Commands that require device movement, such as read, write, rewind, load, unload, or seek, will probably conflict with a device reservation. However commands that may not require device reservation may also conflict with an existing reservation. These commands may include commands such as the SCSI "Persistent Reserve Out" command with the Clear service action. Commands of this type do not require device movement, but can dramatically interfere with a data operation of a host holding an existing reservation. The types of commands that conflict with the device reservation may vary depending upon the type of command that was issued to reserve the device, as well as the type of device. In alternate embodiments, the determination may not be performed as all commands may conflict with device reservation Commands that are not of a type that conflicts with device reservation are executed 325. If the command is of a predetermined type of command that conflicts with reservation, a check is performed to determine if the device is reserved 315. This process will be described more fully below with reference to FIG. 4.

At 405, a determination is made if the device is reserved for a host. If there is no host assigned to a reservation, the device is not reserved 420. Otherwise, a timer is checked to determine if the reservation period has expired 410.

If the time period has expired, the device is not reserved. If the timer has not expired, the device is reserved 415. The reservation may also indicate the host assigned to the reservation. In alternate embodiments, the timer may be checked before checking to determine whether a host is assigned to a reservation. Additional methods to determine if a device is reserved are also contemplated. For example, a Boolean flag may be used to indicate a reserved or unreserved status. This flag may be automatically updated, upon the expiration of the reservation time period, to unreserved.

Returning to FIG. 3, if the device is not reserved, the command is executed 325. If the device is reserved, a determination is made as to whether the device is reserved to the first host initiating the current command. The command is executed 325 if the reservation is to the first host. Otherwise, the command is denied 330. The command may be denied by aborting the command, returning an error message, or returning another type of indication that the command was not executed.

Before or after the command is executed 325, a device reservation process, such as that illustrated in FIG. 2 may be performed. In one embodiment, the determination whether the command is a predetermined type of command 310 may also include a determination that the command requires device reservation. In this embodiment, the device reservation process may only consist of reserving the device 220 and setting or resetting the reservation time period 225.

It should be appreciated that the order of the process depicted in FIG. 3 may be changed. For example, the determination whether the device is reserved 315 may be made before determining whether the command is a predetermined type of command 310. Additionally, the determination that the device is reserved by the host initiating the current command 320 may be performed as part of the device reservation determination 315.

What is claimed is:

1. A method comprising:
   upon receiving a device command from a first host for a data transfer operation to a storage device,
   i) reserving for the first host the storage device targeted by the device command;
   ii) setting a reservation time period for expiration of a reservation of the storage device, the reservation time period being determined based on a command type of the device command, wherein the device command comprises one of a write command, a rewind command, a read command, a load command, an unload command, and a seek command; and
   iii) preventing other hosts from interfering with the data transfer operation between the first host and the storage device during the reservation time period.

2. The method of claim 1, further comprising upon receiving a second device command from the first host, resetting the reservation time period.

3. The method of claim 1, further comprising:
   upon receiving a device command targeted to the device from a second host,
   determining if the device is reserved; and
   if the device is reserved to a host other than the second host, denying the device command from the second host.

4. The method of claim 3, wherein determining if the device is reserved comprises determining if the reservation time period has expired.

5. The method of claim 3, further comprising if the device is not reserved, executing the device command from the second host.

6. The method of claim 3, wherein the device command from the second host comprises a clear command.

7. The method of claim 1, wherein the device command comprises a tape device command.

8. The method of claim 1, wherein the device command comprises a disk device command.

9. The method of claim 1, wherein the device command comprises a Small Computer System Interface (SCSI) command.

* * * * *